July 30, 1968  E. SNITZER  3,395,356
LASER AMPLIFIER DEVICE
Filed Oct. 26, 1966
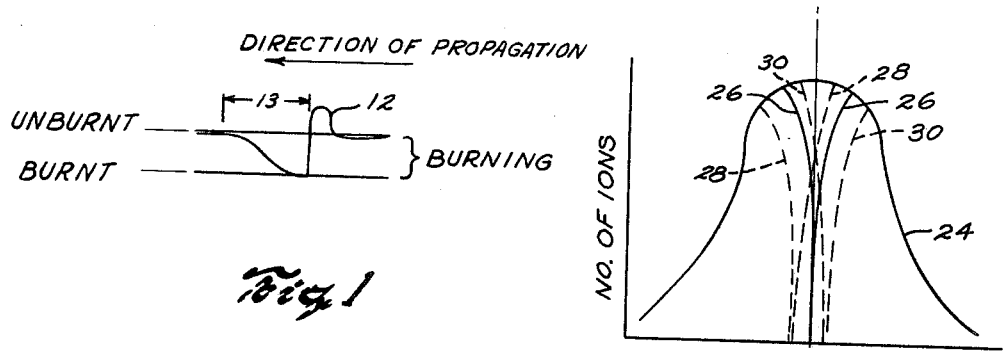
Fig. 1
Fig. 3
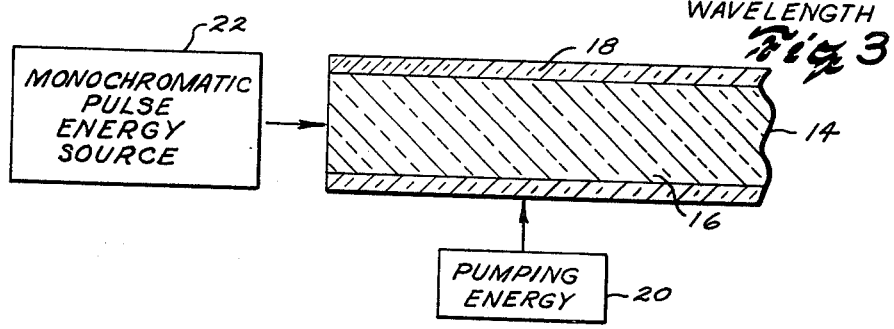
Fig. 2
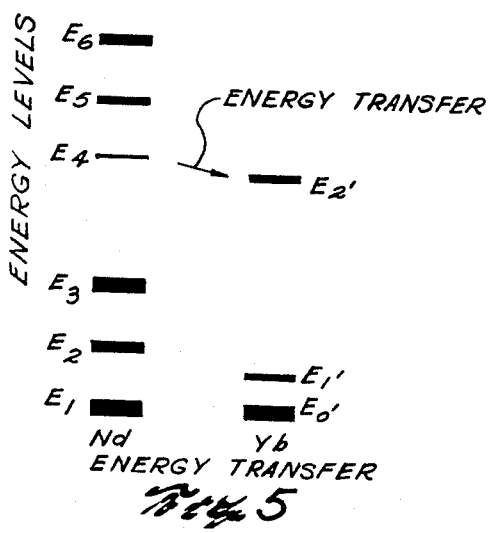
Fig. 5
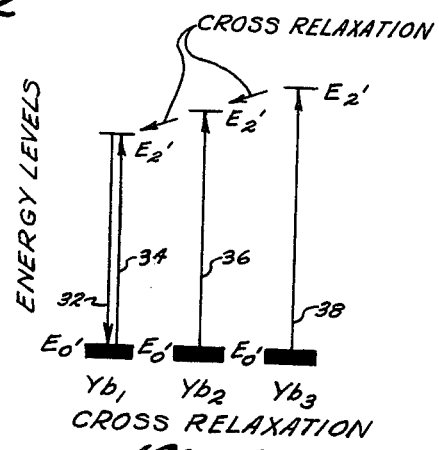
Fig. 4
INVENTOR.
ELIAS SNITZER
BY J. Albert Hultquist
ATTORNEY

United States Patent Office 3,395,356
Patented July 30, 1968

3,395,356
LASER AMPLIFIER DEVICE
Elias Snitzer, Sturbridge, Mass., assignor, by mesne assignments, to American Optical Company, Southbridge, Mass., a corporation of Delaware
Continuation-in-part of application Ser. No. 411,203, Nov. 16, 1964. This application Oct. 26, 1966, Ser. No. 595,291
5 Claims. (Cl. 330—4.3)

ABSTRACT OF THE DISCLOSURE

A laser device wherein within the host material is placed ions of one kind in a sufficient concentration to provide repopulation of selected ions by transfer of energy to selected ions from neighboring ions after the selected ions have lased, or a host material containing one type of ions and another type of different neighboring ions both ions being in such a concentration that energy can be transferred to selected ions, once the selected ions have lased, by the different neighboring ions, thus providing an improved laser material which substantially reduces the refractory time period between successive laser pulses.

---

This invention is a continuation-in-part of S.N. 411,203, filed Nov. 16, 1964, for "Laser Device" by Elias Snitzer, inventor, and now abandoned.

This invention relates to amplification devices and more particularly to laser amplifiers and materials useful therein for increasing the repetition rates of outputs therefrom by shortening the refractory period of said devices.

In order to describe the invention, it is important first to briefly set forth the operating characteristics of lasers, sometimes referred to as optical masers. Lasers are light-amplifying or light-producing devices and are specifically adapted to provide an output of high-intensity, coherent, monochromatic light. Such light is produced in a laser (an acronym for light amplification by stimulated emission of radiation) by photonic emission from the activator ions or atoms of a body composed of a so-called laser host material, which is disposed coaxially within a resonant cavity. These atoms, which are in a "positive temperature" state, absorb a quantum of light or energy from a pumping source, which is at a frequency corresponding to the difference in energy between two of the energy levels of the atom. The atoms are thereby "pumped" or excited to a high energy level and a "negative temperature" state of population inversion, from which they rapidly and spontaneously (but non-radiatively) relax to a more stable intermediate level (still above the original level). From this intermediate level, the atoms spontaneously relax to the original level with an attendant fluorescent emission.

The fluorescent energy emitted by the spontaneously relaxing atoms passes through the resonant cavity to the ends thereof and is then reflected back and forth through the cavity to excite other atoms at the intermediate energy level to induce them to undergo emissive transitions downward, producing more light and augmenting the bidirectionally reflected light to induce still further emissive transitions from the intermediate level population. In this way, a rising pulse of bidirectionally reflected light quickly develops within the cavity, reaching a quantitatively large value as the emissive transition of atoms from the intermediate level population becomes massive. Light of high intensity is, accordingly, created in one or a succession of light pulses while the pumping source is active, the action continuing until depletion of the intermediate level population restores the laser body to a positive temperature state. To permit emission of a portion of this bidirectionally reflecting light pulse or pulses from the laser cavity, one reflective end of the cavity is made partially transmissive and the fraction of light escaping therethrough constitutes the laser output.

Since the stimulated transition downward from the intermediate energy level occurs in a significantly shorter time period than the time period necessary for establishment of the negative temperature distribution of energy levels of the atoms, it may be seen that the time between pulses is largely determined by the ability of the device to attain the negative temperature state in a short time period. The invention described herein is more clearly understood by analogy of this time period for attainment of a negative temperature distribution to the refractory period of a neuristor device. A neuristor, as described by H. D. Crane in an article entitled "The Neuristor" appearing in Principles of Self Organization edited by Foerster and Zopf, pages 403 through 415 (Pergamon Press, New York, 1962), is a device stimulated to propagate a signal down its line or channel by the application of energy thereto. Once the neuristor line is so stimulated, it propagates a signal at a uniform velocity and without attenuation, which produces a refractory condition which may be defined as the time period necessary for each portion of the line, following propogation therethrough, until the line is in condition to propagate another pulse. To complete this analogy, it may be said that the refractory period of the laser amplification device is the time taken for atoms in the laser body to attain a negative temperature distribution state, after such atoms have made a transition to the lower energy level, in order to permit another pulse to be propagated. Shortening of this refractory period in the laser would of course, allow a higher frequency or greater repetition rate in the output of the laser device, and such high frequencies allow for advantages such as increased bandwidths for signal communications.

Accordingly, the present invention is directed towards reducing the refractory period by providing laser materials in such concentrations absolutely and relative to each other, that the intermediate energy level or metastable level of the laser atomic distribution is almost perpetually populated by energy transfer between the closely packed ions of the material, thereby providing a quickly recurring negative temperature state and a high repetition rate capability for the laser propagation.

These and other objects of the invention are accomplished in one illustrative embodiment by a solid laser device with a shortened refractory period provided by the transfer of energy between metastable states of two fluorescent materials, said energy transfer being enabled by high concentrations of at least one material. In this way, when a stimulated emission occurs in one material causing a reduction in the population of atoms in the metastable energy level for that material, that metastable level is quickly replenished by the transfer of energy from the atoms existing at the metastable level of the other material.

Another embodiment features a single fluorescent material provided in high enough concentration, so that energy may be non-radiatively transferred between metastable levels of adjacent ions or atoms. This transfer of energy atoms is referred to herein as "cross-relaxation" and occurs when the metastable level for the material is depleted and the atoms are quickly raised to an energy level sufficient to replenish the depleted metastable level by transfer of energy between neighboring atoms or ions.

Other objects, features and embodiments are contemplated and will be apparent from the following more detailed description with reference to the accompanying drawings, wherein:

FIG. 1 is a graphical representation of the operating characteristics of a neuristor, useful in comprehending the operating characteristics of the present invention;

FIG. 2 is a representation of an amplifier device according to the present invention;

FIG. 3 is a plot of the number of ions versus the various wavelengths at which their fluorescent energy levels exist. This is the so-called "inhomogeneous" broadening of the line, which is produced by the glassy host in which the ions or atoms are contained;

FIG. 4 is a representation of energy levels for different groups of ions of trivalent ytterbium in the amplifying device of FIG. 2, with a depiction of the inter-relationships of the ions by means of cross-relaxation; and FIG. 5 is an energy level diagram of the ions of trivalent neodymium and trivalent ytterbium and a depiction of the energy transfer between the metastable levels of each.

Referring first to FIG. 1, there is shown a representation of the operating characteristic 12 of a neuristor line. A neuristor device can be likened to a re-usable fuse, wherein its normal state is an "unburnt" condition. After a pulse has passed, the neuristor goes through a "burning" period, after which time it is in a "refractory" condition which includes the time it is "burnt" and the time period 13 necessary for it to be made re-usable by returning to the "unburnt" condition. The analogy between a device of the present invention is best described by direct analogy with the previously mentioned "unburnt," "burning," and "refractory" periods or conditions of the neuristor. For instance, the unburnt condition of a neuristor is comparable to the negative temperature distribution state of a laser material, when the metastable energy level is sufficiently populated for stimulated downward transition to occur. The burning period can be likened to the transition downward or the stimulated emission of radiation by ions of the fluorescent material. This transition downward causes a "burnt" condition or, in other words, a positive temperature distribution. The positive temperature distribution and the ensuing period during which the laser device is repumped is a refractory period, or the time it takes for re-establishment of the necessary inversion after "dumping" of ions or atoms from the metastable energy level. This period is significant, since a high repetition rate output is made impossible by the fact that a succeeding laser output pulse cannot be generated usually for one to ten microseconds. Therefore, the shortening of this refractory period is the primary object and subject matter of the invention described herein.

A laser amplifier device is depicted in FIG. 2 as comprising an amplifier 14 with a central core 16 of laserable material and a cladding 18 concentrically surrounding said core. The cladding 18 is of a transparent glass whose index of refraction is less than the index of refraction of the core 16. In this way, the cladding serves to retain light energy within the core for propagation therethrough. The ends of the core are of low reflectance, since oscillations are unnecessary to stimulate downward transitions, which are caused by the output of source 22. Also, reflections could serve only to increase oscillation with a detrimental effect on gain. A source of pumping energy 20 provides an energy source for the establishment and re-establishment of a negative temperature distribution of the core material 16. The monochromatic or single frequency energy source 22 provides pulses of energy to one end of the amplifier device, with that source comprising a laser device such as that described in the introduction of this specification. Each of the pulses from the energy source 22 is propagated and amplified through the amplifier device by either the cross-relaxation of ions or atoms of a single solid fluorescent material or by energy transfer between ions of two solid fluorescent materials, as will be explained more completely with reference to FIGS. 4 and 5. It should be understood that the immediately preceding description with reference to the use of a single frequency source 22 for a laser amplifier is likewise applicable and extendable to the use of a single frequency propagating means such as a filter in the cavity of a laser oscillator to produce the same result; that is, the propagation of inversion depleting stimulated light in a narrow enough band of wavelengths so that only the emitting ions will be depleted leaving energy transferring ions still in an inverted state to transfer their energy to the depleted ions.

The problem of lessening a protracted refractory period is graphically described with its general solution by reference to the plot of FIG. 3, which shows a bell-shaped curve 24 of the relationship between the number of ions and the wavelength of light emission from those ions. Curve 26 shows the area of depleted population of ions at the wavelength $\gamma'$, said depletion being caused when a pulse has passed and radiation is stimulated to be emitted as a laser output. This area 26 must be re-populated before a succeeding laser output can be achieved, and as previously described, one way of achieving such re-population is by re-pumping with energy source 20. However, it is recognized that if a sufficient concentration of ions of a single solid fluorescent material is provided for the amplifier core 16 of FIG. 2, a transfer of energy, or "cross-relaxation," between neighboring ions of that material can accomplish the re-inversion necessary for subsequent radiative output at a much quicker rate. The wavelength of energy emission from these neighboring ions is depicted in FIG. 3 by curves 28 and 30. Cross-relaxation tends to re-establish the population of ions within the area circumscribed by curve 26, since the curves for the neighboring ions 28 and 30 sufficiently overlap that area. Therefore, if the ions of area 26 have been "dumped" to ground level after a pulse has passed, the energy transferred from the neighboring ions will serve to re-establish the negative temperature distribution of ions within the area 26. A very fast repetition rate of output pulses from the laser can thereby be obtained.

Similarly, two fluorescent materials having substantially identical wavelength separation between the metastable energy state and the terminal state for their respective ions, can be made to accomplish the same result as that provided by the single fluorescent material and graphically described in FIG. 3.

FIG. 4 represents the energy levels of trivalent ytterbium in various groups of ions or atoms of the amplifier device 14. The upper or metastable energy level $E_2'$ for the three ion groups $Yb_1$, $Yb_2$, and $Yb_3$ in FIG. 4, represents the $^2F_{5/2}$ state and the lower or ground energy level $E_0'$ for the ion groups represents the $^2F_{7/2}$ state in spectroscopic notation. Atoms in the core 16 of the amplifier device of FIG. 2 are excited from the ground level $E_0'$ to the metastable level $E_2'$ by the source of pumping energy 20. The atoms in the excited or metastable state subsequently go through an energy transition 32 to the ground state $E_0'$, stimulated by the output of source 22, and radiate energy of a frequency corresponding to the energy differences between these two states. This downward transition of atoms from the metastable state to the ground state in this first group of ions $Yb_1$ causes a depopulation of the metastable level $E_2'$ for those ions. However, cross-relaxation of energy from neighboring ions in the metastable level for $Yb_2$ ions can be made to re-establish a negative temperature distribution for ions $Yb_1$ in substantially less than one microsecond, which allows a subsequent output to be quickly enabled. Likewise, the metastable level of $Yb_2$ ions is quickly re-populated by a transfer of energy from neighboring $Yb_3$ ions. By this means of cross-relaxation, the metastable energy levels of all ions are quickly re-established after "dumping" and furthermore, re-pumping by source 20 is all the time causing a re-inversion along transition lines 34, 36 and 38. In this embodiment, a concentration of approximately 15 weight percent $Yb_2O_3$ accomplishes the result, since cross-relaxation is enabled by the proximity of the ions. (A concentration of 5–50 weight percent will be satisfactory, but approximately 15 weight percent is preferred.)

An energy transfer is also used to the same advantage between two different solid fluorescent materials, as is shown in FIG. 5. In that figure, a neodymium material ($Nd^{3+}$) is shown to have a number of energy levels $E_1$–$E_6$, representative of its energy level possibilities, and the ytterbium material ($Yb^{3+}$) is shown to have three levels $E_0'$, $E_1'$, $E_2'$. (In spectroscopic notation, the metastable level of neodymium is $^4F_{3/2}$ and the levels $E_3$, $E_2$ and $E_1$ are respectively $^4I_{13/2}$, $^4I_{11/2}$, $^4I_{9/2}$.) An amplifier using these two materials in heavy enough concentration will operate with the pumping energy from source 20 causing a transition upward of energy state by ions or atoms in the ground state. Therefore, the energy level transitions are from $E_1$ of neodymium and $E_0'$ of ytterbium to either energy levels $E_4$–$E_6$ of neodymium or $E_2'$ of ytterbium, respectively. Any neodymium atoms attaining energy levels $E_5$ or $E_6$ will subsequently go through a downward transition of energy levels, non-emissively, to metastable energy level $E_4$. In this way, the metastable levels of neodymium and ytterbium are populated sufficiently to establish a negative temperature distribution condition, so that a stimulated downward transition of ytterbium ions will "dump" the atoms from the metastable state $E_2'$. However, the fact that metastable energy level $E_2'$ of $Yb^{3+}$ is slightly lower than the metastable energy level $E_4$ of $Nd^{3+}$ will enable a transfer of energy between these levels, thereby re-populating the metastable level $E_2'$. By this energy transfer, the ytterbium is quickly re-established in a negative temperature state so that a succeeding stimulation will cause a laser output in the amplifier without a protracted refractory period for the atoms previously dumped to the $E_0'$ level. For accomplishment of this energy transfer between metastable energy levels of different solid fluorescent materials, concentrations of approximately 5 weight percent of the oxide of neodymium and 6 weight percent of the oxide of ytterbium is used and recommended, even though concentrations of $\frac{1}{10}$ to 10 weight percent of the oxide of neodymium and 1 to 10 weight percent of the oxide of ytterbium will enable a substantial increase in the repetition rate.

As an alternate embodiment, the $E_1'$ level of ytterbium can be used as the terminal level as is shown in FIG. 5, since it is a part of a split ground level of that material, and by the use of liquid nitrogen or other means, level $E_1'$ is depleted in population in comparison to the lower of the two split levels. The negative temperature is then established between energy levels $E_2'$ and $E_1'$ rather than $E_2'$ and $E_0'$ in both the cross-relaxation and energy transfer devices and thereby more readily established. Also, it is possible to use gaseous laser materials according to the invention as described herein.

I claim:
1. The new amplifier use of a laser device having an elongated body of a host material containing laserable ions having a characteristic inhomogeneously broadened line width, said body having low reflective ends and means for introducing pumping energy into said body characterized in the following steps: (a) selecting the concentration of said ions absolutely and relative to each other so that the intermediate energy level or metastable level of the laser atomic distribution may be almost perpetually populated by energy transfer between closely-packed ions within said host material whereby transfer of energy between said ions can take place and an inversion of population at various wavelengths within said inhomogeneously broadened line width be established, (b) applying pumping energy to said ions to cause such inversion of population, (c) introducing energy within said device as substantially single frequency inversion depleting light at a wavelength within said broadened line width for stimulating depletion of said inversion in a selected one of said ions only with an attendent homogeneous line width which is substantially narrower than said inhomogeneously broadened line width, (d) immediately thereafter re-inverting the energy state of said selected ions by energy transfer from other than selected ions at a greater rate than the rate at which said selected ions can be re-inverted by only applying pumping energy to said device, and (e) again applying pumping energy to at least the other of said ions.

2. The invention according to claim 1 wherein said laserable ions are all trivalent ytterbium ions included within said host material in a concentration of 5 to 50 weight percent of the oxide and wherein said transfer of energy is by cross-relaxation.

3. The invention according to claim 2 wherein said trivalent ytterbium ions are included within said host material in a concentration of 15 weight percent of the oxide.

4. The invention according to claim 1 wherein said laserable ions comprise trivalent neodymium and trivalent ytterbium ions included within said host material in a concentration of $\frac{1}{10}$ to 10 weight percent and 1 to 10 weight percent, respectively, of the oxide and wherein said transfer of energy is by energy transfer between said ions.

5. The invention according to claim 4 wherein said trivalent neodymium and trivalent ytterbium ions are included within said host material in a concentration of 5 weight percent and 6 weight percent, respectively, of the oxide.

References Cited

UNITED STATES PATENTS 3,208,009  9/1965  Etzel et al. _____ 331—94.5

OTHER REFERENCES

Kiss et al.: "Applied Physics Letters," Nov. 15, 1964, pp. 200–202.

Gandy et al.: "Applied Physics Letters," Feb. 1, 1965, pp. 46–49.

Johnson et al.: "Physical Review," Jan. 20, 1964, pp. A494–A498.

Peterson et al.: "Applied Physics Letters," June 15, 1964, pp. 201–204.

ROY LAKE, *Primary Examiner.*

D. R. HOSTETTER, *Assistant Examiner.*